United States Patent
Rose

(10) Patent No.: US 8,561,040 B2
(45) Date of Patent: Oct. 15, 2013

(54) ONE-PASS COMPILATION OF VIRTUAL INSTRUCTIONS

(75) Inventor: John Robert Rose, San Jose, CA (US)

(73) Assignee: Oracle America, Inc., Redwood City, CA (US)

(*) Notice: Subject to any disclaimer, the term of this patent is extended or adjusted under 35 U.S.C. 154(b) by 879 days.

(21) Appl. No.: 12/401,455

(22) Filed: Mar. 10, 2009

(65) Prior Publication Data

US 2010/0235819 A1    Sep. 16, 2010

(51) Int. Cl.
*G06F 9/45* (2006.01)
(52) U.S. Cl.
USPC .......................... 717/148; 717/153
(58) Field of Classification Search
USPC .................................. 717/124–153
See application file for complete search history.

(56) References Cited

U.S. PATENT DOCUMENTS

| | | | |
|---|---|---|---|
| 5,386,562 A | 1/1995 | Jain et al. | |
| 7,321,965 B2 | 1/2008 | Kissell | |
| 7,376,954 B2 | 5/2008 | Kissell | |
| 7,418,585 B2 | 8/2008 | Kissell | |
| 7,424,599 B2 | 9/2008 | Kissell et al. | |
| 7,594,089 B2 | 9/2009 | Vishin et al. | |
| 7,610,473 B2 | 10/2009 | Kissell | |
| 7,676,660 B2 | 3/2010 | Kissell | |
| 7,676,664 B2 | 3/2010 | Kissell | |
| 7,694,304 B2 | 4/2010 | Kissell | |
| 7,711,931 B2 | 5/2010 | Kissell | |
| 7,725,689 B2 | 5/2010 | Kissell | |
| 7,725,697 B2 | 5/2010 | Kissell | |
| 7,730,291 B2 | 6/2010 | Kissell | |
| 7,836,450 B2 | 11/2010 | Kissell | |
| 7,849,297 B2 | 12/2010 | Kissell | |
| 7,870,553 B2 | 1/2011 | Kissell | |
| 2005/0188362 A1* | 8/2005 | Metzger et al. | 717/151 |
| 2009/0313604 A1* | 12/2009 | Miceli | 717/120 |

OTHER PUBLICATIONS

Author Unknown, EFI Fat Binaries, http://refit.sourceforge.net/info/fat_binary.html, date unknown, 2 pages.
Bornstein, Davlik Virtual Machine, date unknown, 7 pages.
Staff of Berkley Design Technology, Inc., MIPS Technologies MIPS32® 74KTM Licensable Processor Core, 2007, 6 pages.
Rose, with Android and Dalvik at Google I/O, May 31, 2008, 6 pages.

* cited by examiner

*Primary Examiner* — Chuck Kendall
(74) *Attorney, Agent, or Firm* — Polsinelli PC

(57) ABSTRACT

In embodiments, prior to compilation into machine code, a preprocessor generates directives by processing a source code and/or bytecode representation of a program and/or selecting default directives. The preprocessor embeds the directives in a bytecode representation of the program or a separate stream associated with the bytecode representation of the program. A just-in-time compiler may compile the bytecode representation into machine code directed by the embedded directives in one pass and/or a bytecode interpreter may interpret the bytecode representation of the program. In some embodiments, a computing device generates bytecodes during execution of a program, selects default directives, and embeds the default directives in the bytecodes or a separate stream associated with the bytecodes prior to compilation of the bytecodes into machine code. Subsequently, the bytecodes may be compiled into machine code with a just-in-time compiler directed by the embedded default directives in one pass and/or interpreted with an interpreter.

18 Claims, 7 Drawing Sheets

ONE-PASS COMPILATION OF VIRTUAL INSTRUCTIONS

FIELD OF THE INVENTION

Aspects of this invention relate generally to computing devices, and more specifically to a one-pass compilation of virtual instructions.

BACKGROUND

Virtual instruction architectures (such as Java™ bytecodes) are designed for high efficiency of verification, loading, and execution by a family or virtual machine implementations running on a range of platforms. A virtual machine may constitute a software implementation of a machine or computer that executes virtual instructions as if it were a real machine or computer. The platform range for Java™ generally spans everything from multicore servers to low-power portable devices, such as cellular telephones and personal digital assistants, and includes every major non-virtual instruction architecture (such as the x86 instruction architecture utilized in Pentium™ family of microprocessors or the PowerPC instruction architecture utilized in the PowerPC G4™ family of microprocessors).

On many platforms, the virtual instructions may be further processed by compiling them into machine code. Machine code may constitute low-level code executed by the hardware of a machine or computer, such as by a processing unit of the machine or computer. Virtual instruction compilation, like source code compilation, generally involves front end, middle, and back end activities. Front end activities generally operate on bytecodes to generate intermediate representations by performing multiple passes of block structure reconstruction, decoding, preprocessing, structure analysis, and semantic analysis. Middle and/or back end activities generally include multiple passes performed upon the intermediate representation of analysis, optimization, and machine code generation.

Though many virtual machines include interpreters, which can directly execute the virtual instructions with little or no adjustment, extra speed may be obtained from direct hardware execution of native code (i.e., machine code). The virtual instructions may be compiled into machine code at runtime utilizing a just-in-time compiler, wherein the just-in-time compiler performs the middle and back end activities for compiling the virtual instructions into machine code. Less often, the virtual instructions may be compiled into machine code prior to execution by an ahead-of-time compiler that performs the middle and back end activities for compiling the virtual instructions into machine code.

Just-in-time compilation is generally a complex process and may result in delays in the start of program execution, as well as the speed at which the program executes after starting. The execution costs of just-in-time compilation may be hidden by running interpretively during start-up, but running interpretively also may slow execution because the program starts in an interpretive execution mode instead of at the maximum execution speed of native compiled code (i.e., machine code). Just-in-time compilation of existing bytecode designs is inherently a multi-pass process, involving (even in the simplest just-in-time compilers) multiple layers of intermediate representation, and iterative resolutions of complex issues such as type inference, liveness analysis, and register spilling. While continuous improvements over time in processor speed, and memory speed and density tend to decrease processing unit cycle and memory costs, the cost of just-in-time compilation is still significant, particularly as current computing device systems are limited by memory bandwidth and just-in-time compilation phases may require the manipulation of data sets much larger than the eventual machine code. When a program is being executed on a platform with limited resources, the machine cycles and/or other resources required for multiple passes of just-in-time compilation may result in delays in program execution that are unacceptable for users.

Ahead of time compilation may not involve the same execution time delays as just-in-time compilation, as compilation into machine code is performed prior to execution. However, the program may no longer be portable between platforms after ahead of time compilation into machine code. Further, ahead of time compilation may forgo the benefits of compilation at runtime, since some information about the application is available only while the application is running, and that information may be crucial to optimizing its further execution.

SUMMARY

The present disclosure provides systems and methods for providing a bytecode representation of a program that can be one-pass compiled into machine code utilizing a just-in-time compiler. The present disclosure may shift performance of compilation activities from compilation to translation into the bytecode representation. By shifting these activities, the just-in-time compiler may be enabled to compile the bytecode representation in one-pass as most compilation activities other than machine code generation may have already been performed. Thus, machine cycles and/or other resources necessary for just-in-time compilation may be reduced. The shifted activities may be performed in the context of compilation of bytecodes from source code, in the context of assembly of bytecodes as part of a static and/or dynamic code generation mechanism, such as a post-processing step on previously generated bytecodes without directives, or as a post-processing step refining or adapting previously created directives.

In some embodiments, prior to compilation of a program into machine code, a preprocessor may generate compilation directives about the program. The directives may include information configured to direct compilation of the program into machine code by a just-in-time compiler. The preprocessor may embed the directives into a bytecode representation of the program. The just-in-time compiler may then compile the at least a portion of the bytecode representation into machine code directed by the embedded directives and/or a bytecode interpreter may then interpret the bytecode representation of the program.

The entire bytecode representation may be one-pass compiled by the just-in-time compiler or only a portion of the bytecode representation may be one-pass compiled, such as a frequently utilized portion, and the rest of the bytecode representation may be interpreted by an interpreter, and/or its compilation may be delayed until machine code is necessary or profitable. Portions of the input may be one-pass compiled several times, customizing them each time for different purposes. By using the embedded directives, the just-in-time compiler may compile the bytecode representation of the program into machine code in one pass. The just-in-time compiler may read the directives embedded in the bytecode representation of the program when compiling the bytecode representation into machine code and may follow the directives rather than perform the one or more middle and/or back end compilation activities.

Generating directives may include processing the program, prior to compilation of the program into machine code, to make one or more determinations about how the just-in-time compiler may compile the program into machine code. Such processing may constitute one or more middle and/or back end compilation or optimization activities, the result of which may be represented in the directives. The directives may be processor agnostic or may be formulated for a particular type of processing unit. The directives may be generated by processing a source code representation of the program and/or a bytecode representation of the program.

In addition, generating directives may include selecting directives from a set of default directives. In such a situation, the act of generating directives merely constitutes selecting pre-generated directives. Such default directives may be chosen a priori (such as in a "one size fits all" mode) or may be the result of earlier middle and/or back end compilation activities, the result of which is represented in the set of default directives. The set of default directives may include any specifications about how the program may be compiled into machine code by the just-in-time compiler.

Embedding the directives into a bytecode representation of the program may include inserting one or more directive bytecodes into the bytecode representation of the program. The directives may be generated by processing a first type of bytecode and then inserted into a second type of bytecode. Alternatively, embedding the directives into a bytecode representation of the program may include storing the one or more directive bytecodes in a separate stream associated with the bytecode representation of the program.

In other embodiments, at least one bytecode may be generated during execution of a program by a computing device. The computing device may select default directives for the at least one bytecode from a set of default directives and may embed the default directives into the at least one bytecode or a separate stream associated with the at least one bytecode prior to compilation of the at least one bytecode into machine code. Subsequently, the at least one bytecode may be compiled into machine code in with the just-in-time compiler directed by the embedded default directives and/or interpreted with an interpreter. The at least one bytecode may be compiled into machine code with the just-in-time compiler directed by the embedded default directives in relatively few passes and in some instances, one pass.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

DETAILED DESCRIPTION

The present disclosure may shift performance of one or more middle and/or back end compilation activities for the program from when the program is compiled into machine code to when the program is translated into the bytecode representation, also referred to as "virtual instructions". By shifting these middle and/or back end compilation activities to the generation of the bytecode representation, the just-in-time compiler may be enabled to compile the bytecode representation in one-pass utilizing the directives embedded in the bytecode representation as most compilation activities other than machine code generation may have already been performed. Thus, machine cycles and/or other resources necessary for just-in-time compilation may be reduced. Although the term "bytecodes" suggests a design characterized by a linear series of short instructions composed of octets, the term is used here for any of a broad range of virtual instruction set designs, including those based on octets, machine words, bit streams, tuples, human readable text, non-linear graphs, or any other form suitable to compiler intermediate representations.

Figure 1:
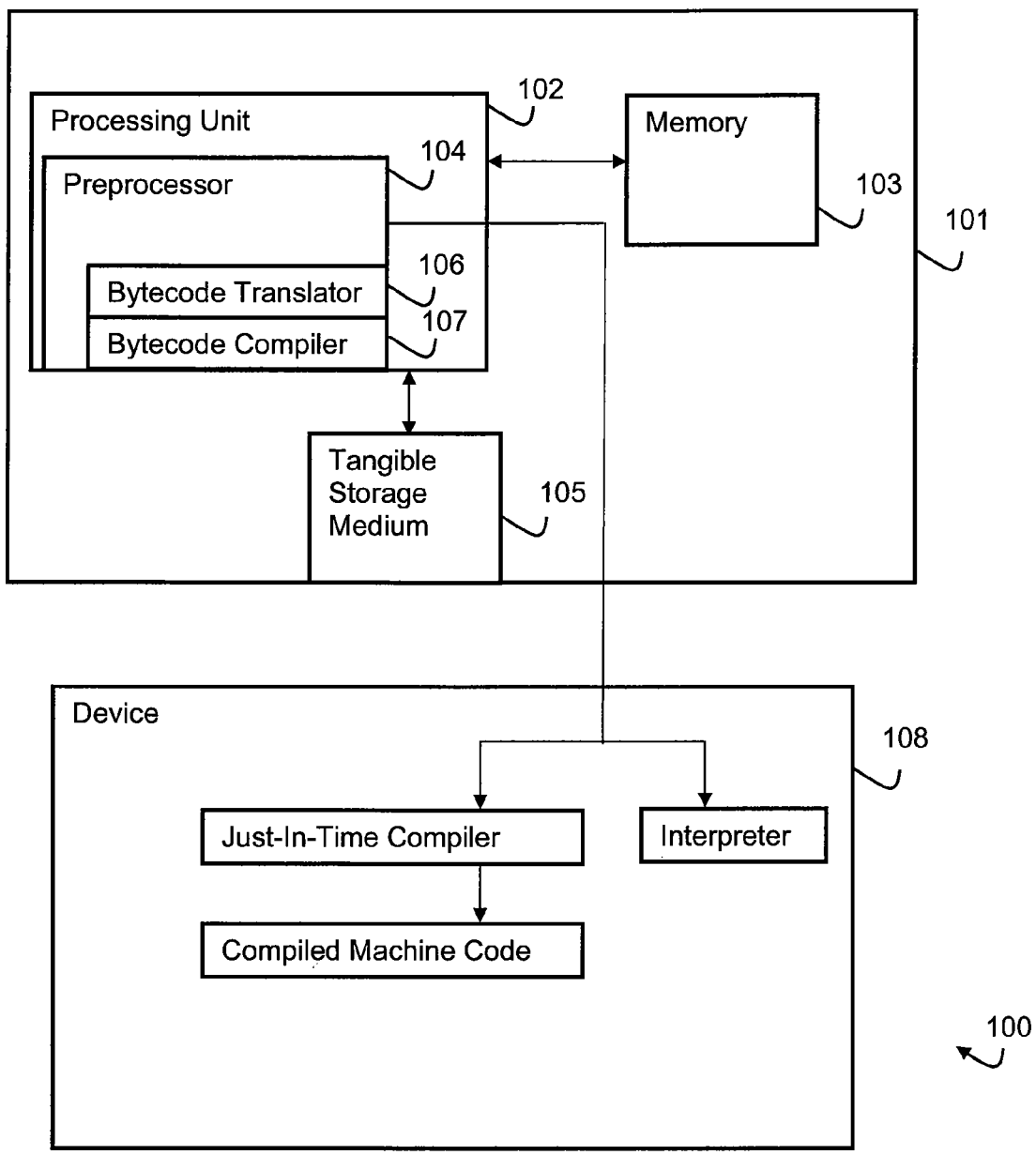
FIG. 1 is a block diagram illustrating a system 100 for providing a bytecode representation of a program that can be one-pass compiled into machine code utilizing a just-in-time compiler, in accordance with an embodiment of the present disclosure.

FIG. 1 illustrates a system 100 for providing a bytecode representation of a program that can be compiled into machine code utilizing a just-in-time compiler in relatively few passes and in some instances, one pass, in accordance with an embodiment of the present disclosure. A pass may constitute a single traversal of code of a program by a compiler during compilation of the program. Every time the compiler re-traverses the code during compilation may constitute another pass. The system 100 may include a computing device 101 which may include a processing unit 102, which may include a preprocessor component 104 involving executable instructions configured to perform various aspects of the present disclosure, and a memory 103 communicably coupled to the processing unit 102. While the system 100 has been described as including computing device 101, a single processing unit 102, and a single memory 103, it will be understood that system 100 is illustrative and that multiple computing devices 101 (which may be communicably coupled), multiple processing units 102, and/or multiple memories 103 may be utilized without departing from the scope of the present disclosure. The computing device 101 may also be configured to interact (read/write) to one or more tangible machine-readable storage media 105, which may or may not be removable and which may include magnetic storage media (e.g., floppy diskette), optical storage media (e.g., CD-ROM); magneto-optical storage media, read only memory, random access memory, erasable programmable memory (e.g., EPROM and EEPROM); flash memory, or other types of media suitable for storing electronic information. Hence, the computing device 101 may include a CD-ROM drive, a floppy drive, a hard disk drive, etc. The computing device 101 may also include (not shown) one or more input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth). The system 100 may also include computing device 108. The computing device 108 may include (not shown) one or more processing units, memories, tangible machine-readable storage media, input and/or output devices (including, but not limited to displays, keyboards, mice, printers, scanners, and so forth), one or more busses (including, but not limited to, universal serial bus, small computer system interface, and so forth), and/or one or more communication components (including, but not limited to, modems, Ethernet adapters, wireless Ethernet adapters, and so forth). The computing device 108 may be communicably connected to the computing device 101. Though the computing device 101 and the computing device 108 are shown as separate devices, in some embodiments the computing device 101 and the computing device 108 may constitute a single device.

Figure 2:
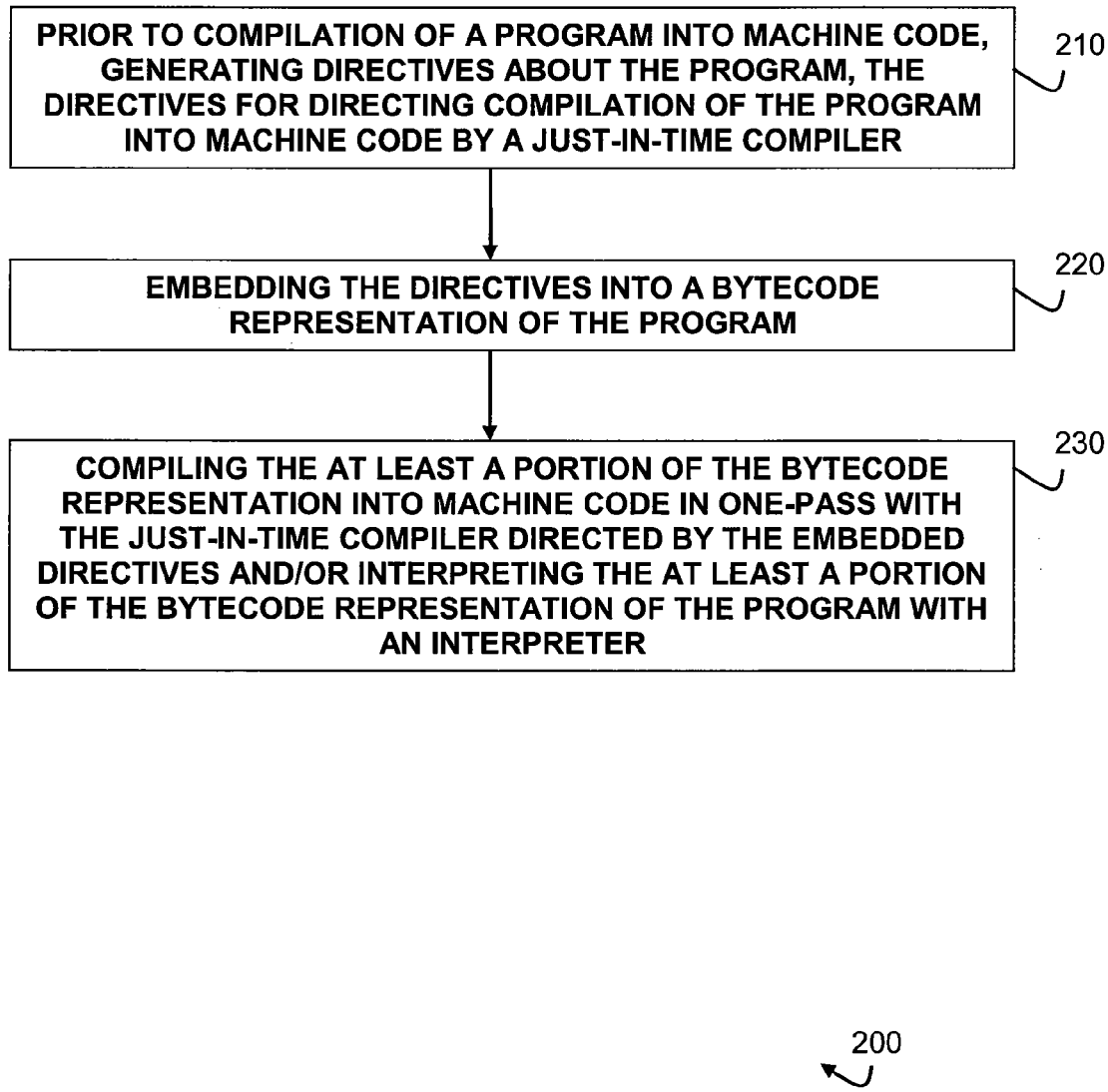
FIG. 2 method diagram illustrating a method 200 for providing a bytecode representation of a program that can be one-pass compiled into machine code utilizing a just-in-time compiler, which may be performed by the system 100 of FIG. 1, in accordance with an embodiment of the present disclosure.

FIG. 2 illustrates a method 200 for providing a bytecode representation of a program that can be compiled into machine code utilizing a just-in-time compiler in relatively few passes and in some instances, one pass, which may be performed by the system 100, in accordance with an embodiment of the present disclosure. The method 200 may comprise a computer-implemented method. The computer-implemented method may be performed by a processing unit, such as the processing unit 102, executing one or more sets of instructions included in a computer program product stored in a machine-readable medium, such as the memory 103 and/or the storage medium 105.

In a first operation 210, prior to compilation of a program into machine code, the preprocessor 104 may generate compilation directives about the program. The directives may include information configured to direct compilation of the program into machine code by a just-in-time compiler. Generating the directives may constitute one or more middle and/or back end compilation activities. The preprocessor 104 may involve a bytecode translator 106 and/or compiler 107 which may translate and/or compile source code and/or bytecode into bytecode.

In a second operation 220, the preprocessor 104 may embed the directives into a bytecode representation of the program. The preprocessor 104 may embed the directives into a bytecode representation of the program by mixing the directives with executable bytecode of the program and/or storing the directives in a separate stream associated with executable bytecode of the program.

The method 200 may include a third operation 230. In the third operation 230, the just-in-time compiler, which may reside on a computing device 108, may compile at least a portion of the bytecode representation into machine code in with the just-in-time compiler directed by the embedded directives and/or a bytecode interpreter, which may also reside on the computing device 108, may interpret the bytecode representation of the program. The entire bytecode representation may be one-pass compiled by the just-in-time compiler or only a portion of the bytecode representation may be one-pass compiled, such as a frequently utilized portion, and the rest of the bytecode representation may be interpreted by an interpreter, and/or its compilation may be delayed until machine code is necessary or profitable. Portions of the input may be one-pass compiled several times, customizing them each time for different purposes. By using the embedded directives, the just-in-time compiler may compile the bytecode representation of the program into machine code in one pass. The just-in-time compiler may read the directives embedded in the bytecode representation of the program when compiling the bytecode representation into machine code and may follow the directives rather than perform the one or more middle and/or back end compilation activities.

One-pass compilation of the bytecode representation may include verifying the bytecode representation. Verifying the bytecode representation may include checking that methods do not perform operations that may cause execution to crash, all arguments are legal, variables are passed to methods are correct, and that all load and store operations have correct types. If the embedded directives in the bytecode representation were formulated for a particular type of processing unit, the just-in-time compiler may one-pass compile the bytecode representation into machine code for that particular type of processing unit and/or a different type of processing unit (though machine code generated based on embedded directives formulated for a particular type of processing unit may not be as efficient when utilized to generate machine code for a different type of processing unit). An interpreter utilized to interpret some or all of the bytecode representation of the program may include a virtual machine, such as a Java™ virtual machine. One-pass compilation and/or interpretation of the bytecode representation may include decompressing the bytecode representation.

The operation of generating directives about the program may include the preprocessor 104 processing the program, prior to compilation of the program into machine code, to make one or more determinations about how the just-in-time compiler may compile the program into machine code. Such processing may constitute one or more middle and/or back end compilation activities, the result of which may be represented in the directives. Hence, the preprocessor 104 may compute derived information such as refined types, loop structure, value invariance, value liveness, and/or register allocation for the program. It may compute or retrieve historical data such as type profiles or execution counts. It may compute advisory directives such as type estimations, profile estimates, inlining directives, optimistic value or type assertions, or customization points. It may generate embeddable directives for any or all such computations. The operation of generating directives may be processor agnostic or may be formulated for a particular type of processing unit.

The preprocessor 104, whether in conjunction with generating directives or separately, may also conduct operations to optimize the program. Optimizing of the program may include performing optimizations that may be implemented when the program is compiled into machine code and/or translated into a bytecode representation of the program. Optimizing of the program may include optimizing the program for a particular type of processing unit. Optimizing of the program may include performing inlining, code customization, loop transformation, induction variable analysis, loop fission, loop fusion, loop inversion, loop interchange, loop-invariant code motion, loop nest optimization, loop reversal, loop unrolling, loop splitting, loop unswitching, software pipelining, constant folding and propagation, strength reduction, common subexpression elimination, induction variable reorganization and elimination, alias classification and pointer analysis, global value renumbering, global code motion, sparse conditional constant propagation, instruction selection, instruction scheduling, rematerialization, reordering computations, removing recursion, data structure fusion, bounds-checking elimination, branch offset reduction, code-block reordering, dead code elimination, factoring out of invariants, jump threading, reduction of cache collisions, stack height reduction, test reordering, trace-splitting, and/or removing one or more methods and/or one or more method traces.

In addition, the preprocessor 104 may be configured to select directives from a set of default directives. In such a situation, the act of generating directives merely constitutes selecting pre-generated directives. Such default directives may be chosen a priori (such as in a "one size fits all" mode) or may be the result of earlier middle and/or back end compilation activities, the result of which is represented in the set of default directives. The set of default directives may include any specifications about how the program may be compiled into machine code by the just-in-time compiler. The set of default directives may function for directing the just-in-time compiler to compile a variety of different programs into machine code, though the just-in-time compiler may not produce as efficient machine code when directed by the default directives as when directed by directives generated by the preprocessor 104 processing the program.

Embedding the directives into a bytecode representation of the program may include inserting one or more directive bytecodes into the bytecode representation of the program. Alternatively, embedding the directives into a bytecode representation of the program may include storing the one or more directive bytecodes in a separate stream associated with the bytecode representation of the program. Directive bytecodes may constitute bytecodes which do not represent data-processing or control instructions (such as an add instruction and/or a branch instruction) but instead contain directives. Essentially, the directive bytecodes may constitute a particular kind of noop (no operation) instruction that contains directives. When a just-in-time compiler compiles the bytecode representation of the program into machine code, the just-in-time compiler may recognize directive bytecodes as containing directives and may follow the directives in compiling the bytecode representation of the program into machine code. Directive bytecodes may also contain verification directives which the just-in-time compiler may check when compiling the bytecode representation of the program into machine code in order to verify the portion of the bytecode representation of the program being compiled into machine code.

For example, the following pseudo code illustrates a basic "for" loop (note: the symbol "//" indicates a comment):

```
int triangleNumber(int n) {
    int sum = 0;
    for (int l = 1; l <= n; i++) sum += l;
    return sum;
}
```

The following Java™ bytecode illustrates an implementation of the above "for" loop in a bytecode representation that does not include embedded directive bytecodes:

```
        iconst #0; istore R1        // sum = 0
        iconst #1; istore R2        // l = 0
.L0:
        iload R2; iload R0;
            if_icmpgt .L1           // (i > n)?
        iload R1; iload R2; iadd;
            istore R1               // sum += i
        iinc R2, #1                 // i += 1
        goto .L0
.L1:
        iload R1; ireturn           // return sum
```

Contrasted with the above Java™ bytecode that does not include embedded directive bytecodes, the following bytecode representation illustrates an implementation of the above "for" loop in a sample Java™ bytecode representation that includes embedded directive bytecodes (the "@" symbol marking bytecodes below indicates that the bytecode is a directive bytecode):

```
        @final R0                   // n is final
        @usable R0, #1              // n has 1 use
        iconst #0; istore R1        // sum = 0
        @nokill R1                  // sum always live
        iconst #1; istore R2        // i = 0
        @loop #1, .L0:              // loop header
        @index R2                   // i is loop index
        iload R2; iload R0;
            if_icmpgt .L1           // (i > n)?
        iload R1; iload R2; iadd
            istore R1               // sum += i
        iinc R2, #1                 // i += 1
        goto .L0
        @block .L1:                 // branch target
        @kill R2                    // i is dead
        iload R1; ireturn           // return sum
```

The embedded directive bytecodes illustrated above include directives regarding liveness, branching, and loops. The directive @final R0 specifies that the value in virtual register R0 will not change. The directive @usable R0, #1 specifies that the value in virtual register R0 has one further use. The directive @nokill R1 specifies that virtual register R1 will be used frequently and not to kill it. The directive @loop #1, .L0: specifies that L0 is the loop header. The directive @index R2 specifies that virtual register R2 is the index of the loop. The directive @block .L1: specifies that L1 is the target of the branch. The directive @kill R2 specifies that the value of virtual register R2 will no longer be used. When a just-in-time compiler compiles the above Java™ bytecode representation (including the embedded directive bytecodes) into machine code, the just-in-time compiler may read the above embedded directive bytecodes and compile the bytecode representation into machine code as directed by the directives regarding liveness, branching, and loops. Such machine code may be of higher quality than could otherwise be prepared in one pass without any directives.

Figure 6:
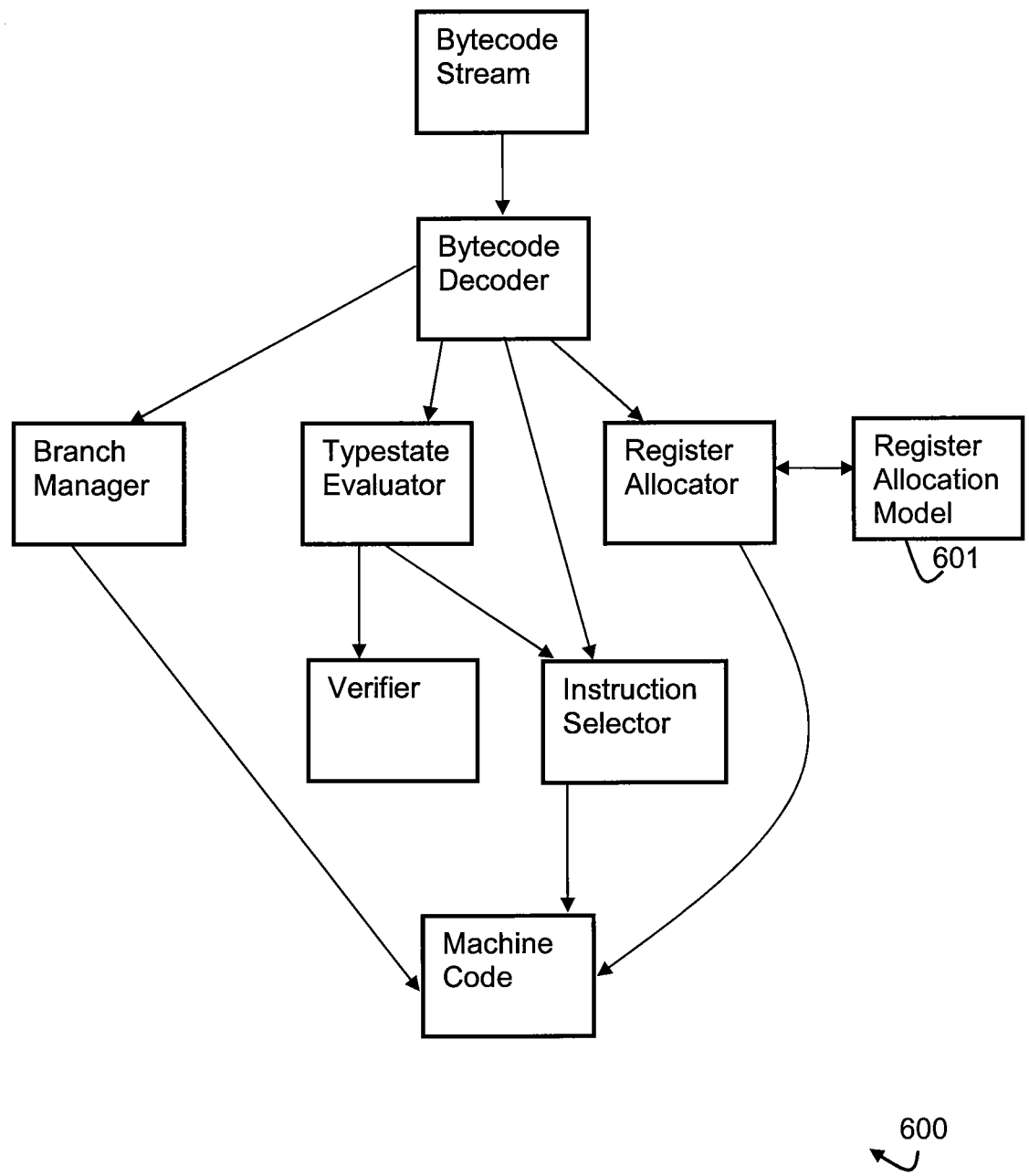
FIG. 6 is a block diagram illustrating a just-in-time compiler compiling a Java™ bytecode representation, including embedded directive bytecodes, into machine code, utilizing the method of FIG. 2.

For example, with reference to FIG. 6, a just-in-time compiler 600 that compiles the above Java™ bytecode representation (including the embedded directive bytecodes) into machine code may maintain a register allocation model 601 which the just-in-time compiler 600 utilizes to map the virtual registers in the Java™ bytecode to one or more physical registers and/or one or more portions of the processor stack during compilation of the Java™ bytecode into machine code. Physical registers may be limited and the just-in-time compiler 600 may, based on the register allocation model 601, map a virtual register to a physical register when it will be utilized more frequently than other virtual registers and to a portion of the processor stack when the virtual register will be utilized less frequently than other virtual registers. When a first virtual register mapped to a physical register will be utilized less frequently than a second virtual register mapped to a portion of the processor stack, the just-in-time compiler 600 may, based on the register allocation model 601, "spill" the first register, or change the mapping of the first virtual register to map to a portion of the processor stack and change the mapping of the second virtual register to map to the physical register previously mapped to the first virtual register. Similarly, when a first virtual register mapped to a portion of the processor stack will be utilized more frequently than a second virtual register mapped to a physical register, the just-in-time compiler 600 may, based on the register allocation model 601, "spill" the second register, or change the mapping of the second virtual register to map to a portion of the processor stack and change the mapping of the first virtual register to map to the physical register previously mapped to the second virtual register. Thus, the state of the register allocation model 601 may control whether the just-in-time compiler 600 generates machine code storing the value of a virtual register at a given point in a physical register or a portion of the processor stack.

In this example, the just-in-time compiler may read the @nokill R1 directive. The @nokill R1 directive may indicate to the just-in-time compiler that the virtual register R1 is always live and will thus be frequently utilized. In response to the directive, the just-in-time compiler may update the register allocation model to make it more likely that the just-in-time compiler will generate machine code storing the value of virtual register R1 in a physical register rather than a portion of the processor stack.

Similarly, the just-in-time compiler may read the @index R2 directive. The @index R2 directive may indicate to the just-in-time compiler that the virtual register R2 is the index of the loop and will thus be frequently utilized during the loop. In response to the directive, the just-in-time compiler may update the register allocation model to make it more likely that the just-in-time compiler will generate machine code storing the value of virtual register R2 in a physical register rather than a portion of the processor stack.

Likewise, the just-in-time compiler may read the @kill R2 directive. The @kill R2 directive may indicate to the just-in-time compiler that the virtual register R2 will no longer be utilized. In response to the directive, the just-in-time compiler may update the register allocation model such that the next time the just-in-time compiler generates machine code storing the value of a virtual register in a physical register rather than a portion of the processor stack, the value of the virtual register may be stored in the physical register previously mapped to virtual register R2.

The operation of generating directives about the program may involve the preprocessor 104 generating a bytecode representation, compressed or uncompressed, of the program from the source code representation of the program. Contemporaneously, the preprocessor 104 may embed the directives in the bytecode representation of the program.

Alternatively, the preprocessor 104 may process a bytecode representation of the program to generate the directives separately. The bytecode representation of the program acted on by the preprocessor 104 may include a first type of bytecode representation of the program that does not have embedded directives. For example, the first type of bytecode representation of the program may include Java™ bytecode. The preprocessor 104 analyzes the Java™ bytecode to generate the directives and embeds the directives in the Java™ bytecode to generate a second type of bytecode representation of the program. By way of another example, the first type of bytecode representation of the program may include Java™ bytecode. The preprocessor 104 analyzes the Java™ bytecode to generate the directives and embeds the directives in a bytecode other than Java™ bytecode to generate a second type of bytecode representation of the program. Subsequently, at least a portion of the second type of bytecode representation of the program may be compiled by the just-in-time compiler directed by the embedded directives in relatively few passes or in some instance, one pass. The preprocessor 104 may compress the generated bytecode representation.

Thus, a bytecode representation of a program which includes embedded directives for directing compilation of the program into machine code by a just-in-time compiler may be generated from a source code representation of the program or a bytecode representation of the program. A bytecode representation of the program including the embedded directives may be generated from source code when a bytecode representation of the program (one which does not include the embedded directives) has not already been generated. Alternatively, a bytecode representation of the program including the embedded directives may be generated from source code when generating a bytecode representation of the program that a just-in-time compiler will be able to compile into machine code in one-pass. A bytecode representation of the program including the embedded directives may be generated from a different bytecode representation of the program (one that does not include the embedded directives) when generating a bytecode representation of the program that a just-in-time compiler will be able to compile into machine code in one-pass when the different bytecode representation of the program is available.

Method 200 may be performed prior to deployment of the program. Deployment may include all of the activities that make a program available for use. Deployment may include release and/or installation of a program. Release and/or installation of a program may include transporting the program from one or more first systems where the program is created to one or more second systems where the program will be run. The program may be transported by various means including, but not limited to, download and/or storing the program to a tangible storage medium at the one or more first systems and transporting the tangible storage medium to the one or more second systems. Thus, the bytecode representation of the program, which may be one-pass compiled by a just-in-time compiler directed by the embedded directives, may be generated prior to deployment of the program.

Figure 3A:
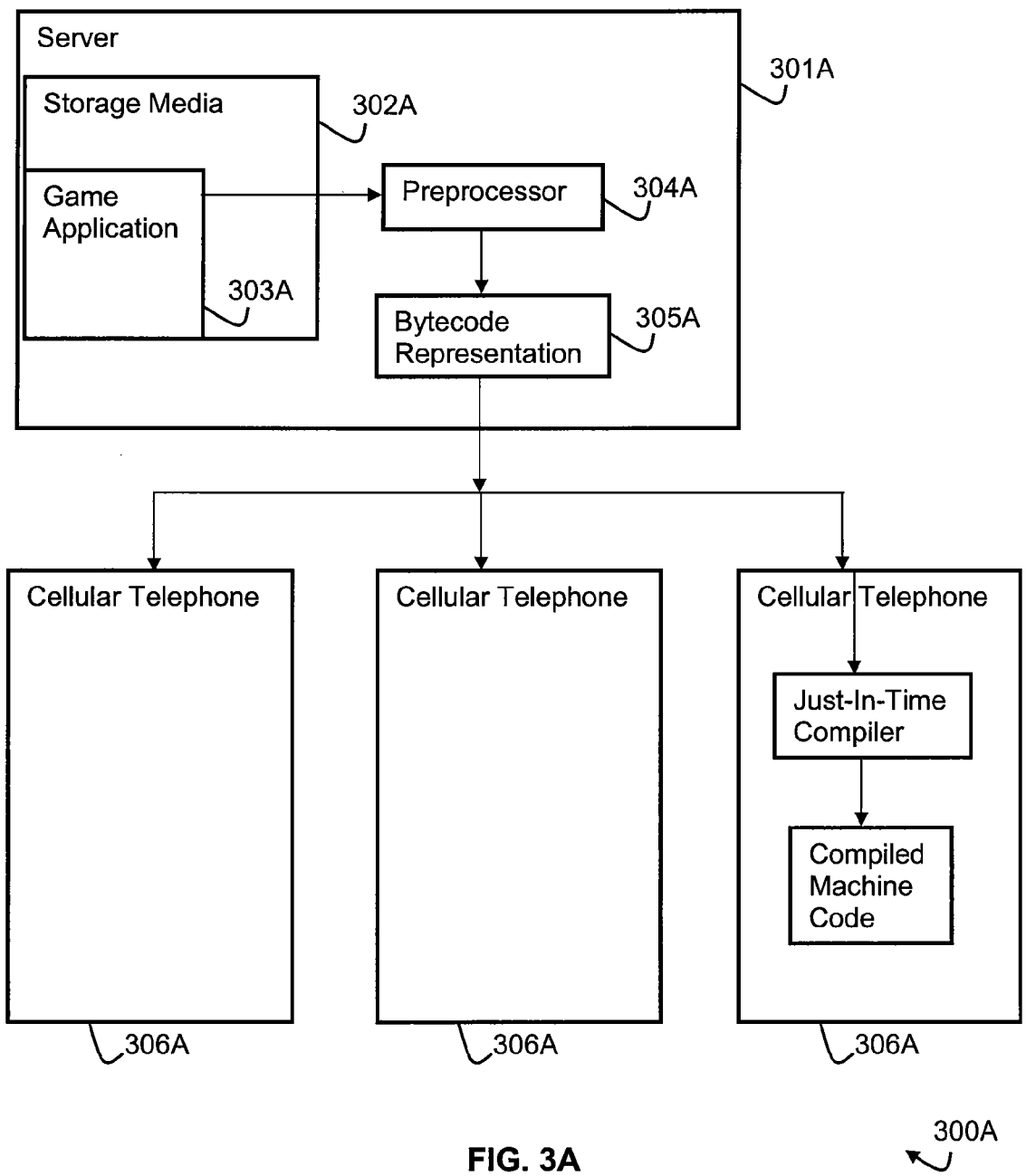
FIG. 3A is a block diagram illustrating a system 300A performing the method of FIG. 2.

For example, with reference to FIG. 3A, the bytecode representation of the program 305A may be generated and deployed to one or more JavaFX™ enabled cellular telephones 306A. In this example, the program may be a cellular telephone game application 303A stored in a tangible storage media 302A on a server computer 301A which is communicably connected to one or more JavaFX™ enabled cellular telephones 306A. The server computer 301A may execute a preprocessor component 304A which generates the directives for the cellular telephone game application 303A and embeds the directives in a bytecode representation 305A of the cellular telephone game application 303A. The one or more JavaFX™ enabled cellular telephones 306A may then download the bytecode representation 305A of the cellular telephone game application 303A from the server 301A. Subsequently, when the one or more JavaFX™ enabled cellular telephones 306A executes the cellular telephone game application 303A, the one or more JavaFX™ enabled cellular telephones 306A may utilize a just-in-time compiler to compile the bytecode representation 305A of the cellular telephone game application 303A into machine code directed by the embedded directives. Because the just-in-time compiler may compile the cellular telephone game application 303A into machine code in one-pass directed by the embedded directives, the one or more JavaFX™ enabled cellular telephones 306A may execute the cellular telephone game application 303A with less delay than if the just-in-time compiler had to make repeated passes.

Alternatively, method 200 may be performed subsequent to deployment of the program. Thus, the bytecode representation of the program, which may be one-pass compiled by a just-in-time compiler utilizing information about compilation determinations embedded in the bytecode representation of the program, may be generated subsequent to deployment of the program.

Figure 3B:
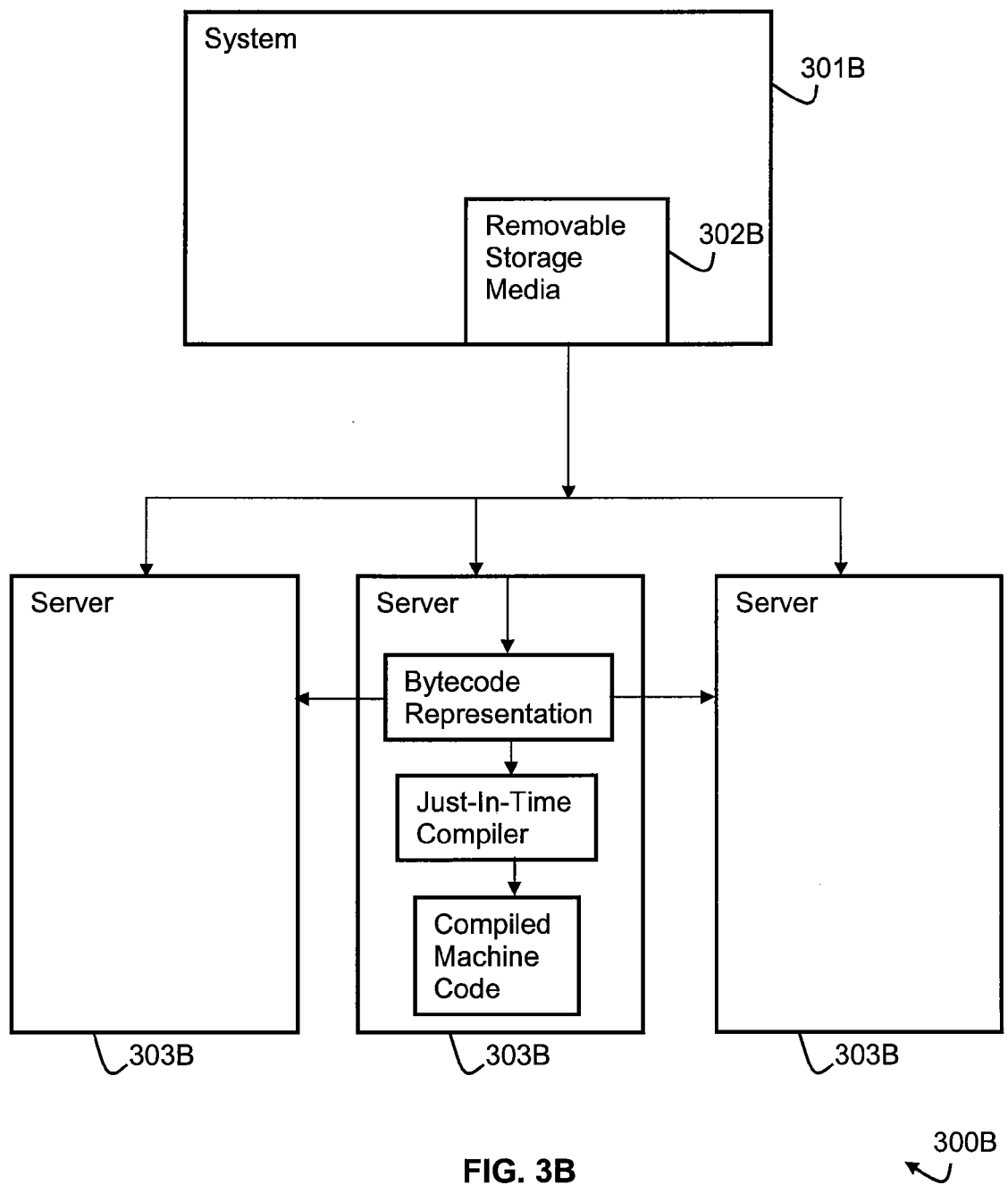
FIG. 3B is a block diagram illustrating a system 300B performing the method of FIG. 2.

For example, with reference to FIG. 3B, the program may be deployed to one or more server computers 303B which may then generate the bytecode representation of the program. In this example, the program may have been created on a first system 301B. The program may be recorded to a removable tangible storage medium 302B which may then be transported to the one or more server computers 303B. The program may then be installed on the one or more server computers 303B from the removable tangible storage medium 302B. When the program is installed and/or previous to execution of the program, at least one of the one or more server computers 303B may generate a bytecode representation of the program with the embedded directives. Then, when the program is subsequently executed, the at least one of the one or more server computers 303B may utilize a just-in-time compiler to compile the bytecode representation of the program into machine code directed by the embedded directives. Because the just-in-time compiler may compile the bytecode representation of the program into machine code in one-pass directed by the embedded directives, the at least one of the one or more server computers 303B may execute the program with less delay than if the just-in-time compiler had to make repeated passes. In this example, the server computer 303B that generates the bytecode representation of the program with the embedded directives may be a different server computer 303B from the server computer 303B that utilizes the just-in-time compiler to compile the bytecode representation of the program into machine code. One of the one or more server computers 303B that executes the program and has not generated a bytecode representation with the embedded directives may obtain the bytecode representation from another of the one or more servers 303B that has generated a bytecode representation of the program with the embedded directives.

Thus, by utilizing method 200 performance of one or more middle and/or back end compilation activities for the program may be shifted from performance when the program is compiled into machine code to when the program is translated into the bytecode representation (i.e., virtual instructions). By shifting these middle and/or back end compilation activities to the generation of the bytecode representation, the just-in-time compiler may be enabled to compile the bytecode representation in one-pass utilizing the compilation determinations embedded in the bytecode representation as most compilation activities other than machine code generation may have already been performed.

Figure 4:
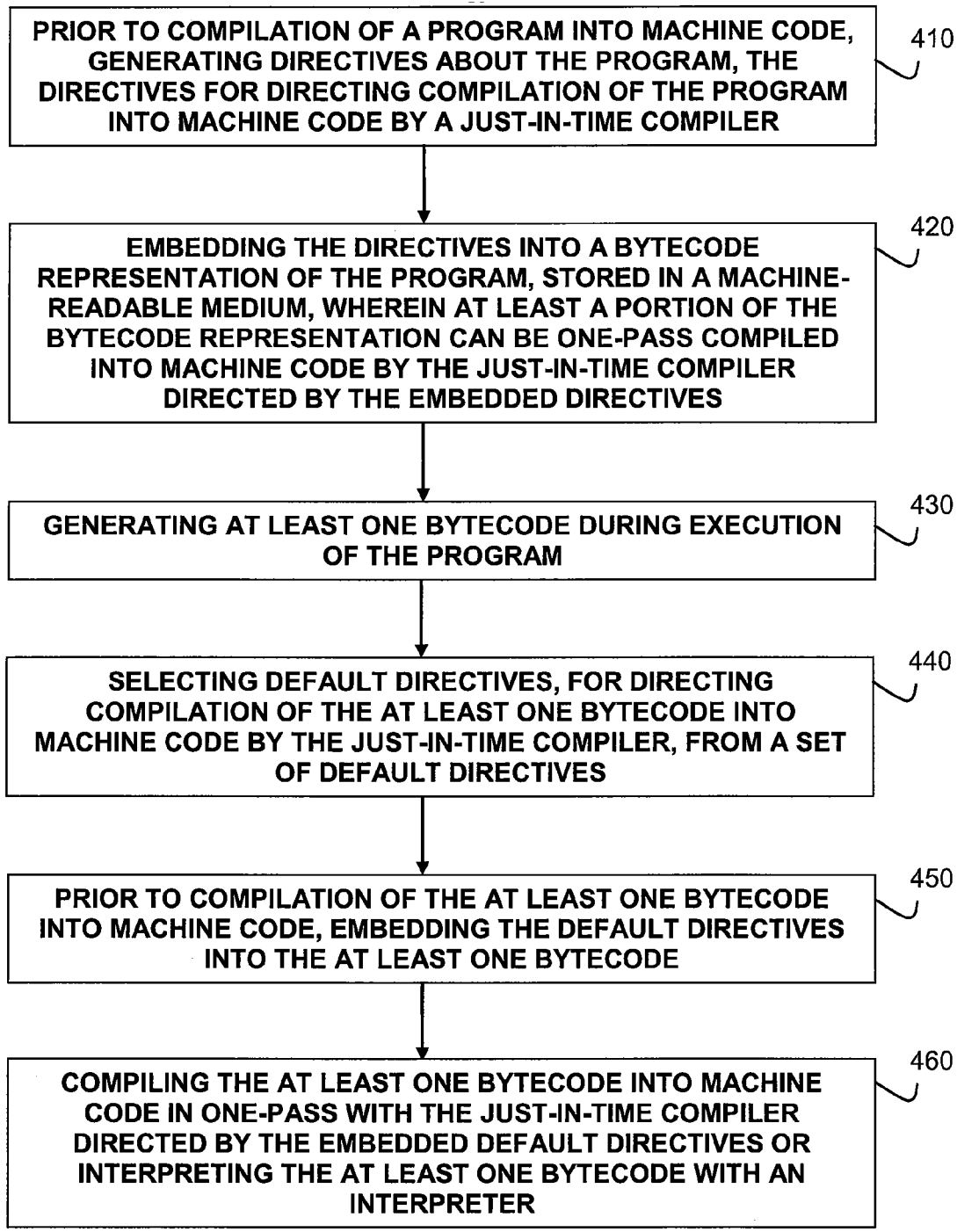
FIG. 4 is a diagram illustrating a method 400 for providing a bytecode representation of a program that can be one-pass compiled into machine code utilizing a just-in-time compiler, which may be performed by the system 100 of FIG. 1, in accordance with a first alternative embodiment of the present disclosure.

FIG. 4 illustrates a method 400 for providing a bytecode representation of a program that can be compiled into machine code utilizing a just-in-time compiler in relatively few passes and in some instances, one pass, which may be performed by the system 100, in accordance with a first alternative embodiment of the present disclosure. The method 400 may comprise a computer-implemented method. The computer-implemented method may be performed by a processing unit, such as the processing unit 102, executing one or more sets of instructions included in a computer program product stored in a machine-readable medium, such as the memory 103 and/or the storage medium 105.

In a first operation 410, prior to compilation of a program into machine code, the preprocessor 104 may generate compilation directives about the program. The directives may include information configured to direct compilation of the program into machine code by a just-in-time compiler. In a second operation 420, the preprocessor 104 may embed the directives into a bytecode representation of the program. Following embedding the directives in the bytecode representation of the program, the just-in-time compiler may compile the bytecode representation of the program into machine code. By using the embedded directives, the just-in-time compiler may compile the bytecode representation for the program into machine code in one pass. In a third operation 430, the computing device 108 may generate at least one bytecode during execution of the program. In a fourth operation 440, the computing device 108 may select default directives for the at least one bytecode from a set of default directives. In a fifth operation 450, the computing device 108 may embed the default directives into the at least one bytecode or a separate stream associated with the at least one bytecode prior to compilation of the at least one bytecode into machine code.

Method 400 may include a sixth operation 460. In the sixth operation 460, the computing device 108 may compile the at least one bytecode into machine code in with the just-in-time compiler directed by the embedded default directives and/or interpret the at least one bytecode with an interpreter. The at least one bytecode may be compiled into machine code with the just-in-time compiler directed by the embedded default directives in relatively few passes and in some instances, one pass.

Contrasted with method 200, during the execution or interpretation of the program, one or more bytecodes may be generated. The execution of the program may generate the one or more bytecodes. The one or more bytecodes may be embedded with default directives such that they can be compiled into machine code by a just-in-time compiler utilizing the embedded directives in relatively few passes and in some instances, one pass. Alternatively, one or more bytecodes of a first type may be generated during execution or interpretation of the program which are then utilized to generate one or more bytecodes of a second type which may then be embedded with default directives such that they can be compiled into machine code by a just-in-time compiler utilizing the embedded directives in relatively few passes or in some instances, one pass.

Although the present method has described bytecodes that may be compiled in relatively few passes generated during execution and/or interpretation of a program including a bytecode representation which could be compiled in relatively few passes by a just-in-time compiler, it is understood that bytecodes that may be compiled in relatively few passes may be generated during execution and/or interpretation of a program that does not include a bytecode representation which can be compiled in relatively few passes by a just-in-time compiler without departing from the scope of the present disclosure.

Figure 5:
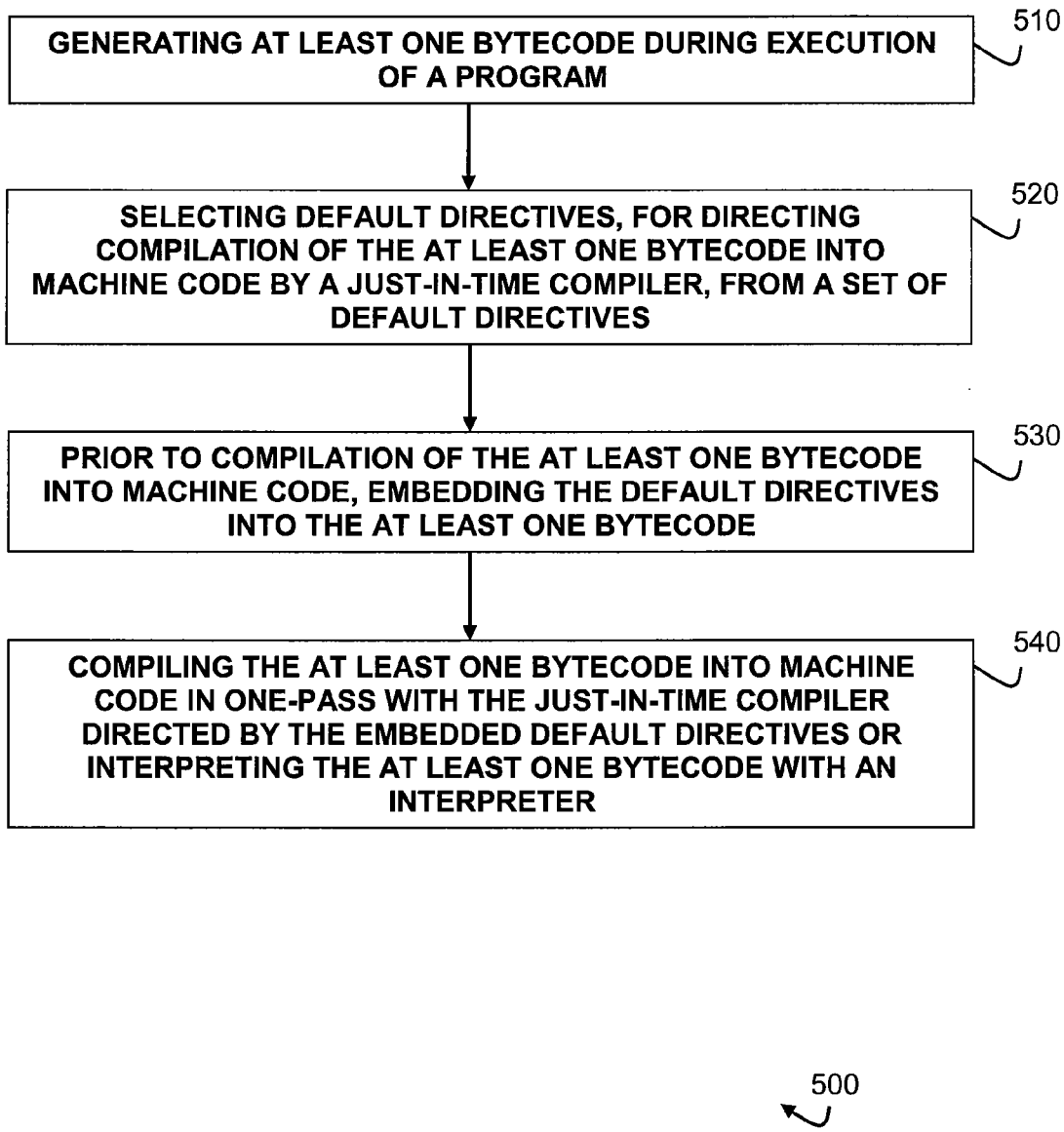
FIG. 5 is a diagram illustrating a method 500 for providing at least one bytecode, generated during execution of a program, that can be one-pass compiled into machine code utilizing a just-in-time compiler, which may be performed by the system 100 of FIG. 1, in accordance with a second alternative embodiment of the present disclosure.

For example, FIG. 5 illustrates a method 500 for providing at least one bytecode, generated during execution of a program, that can be compiled into machine code utilizing a just-in-time compiler in relatively few passes or in some instances, one pass, which may be performed by the system 100, in accordance with a second alternative embodiment of the present disclosure. The method 500 may comprise a computer-implemented method. The computer-implemented method may be performed by a processing unit, such as the processing unit 102, executing one or more sets of instructions included in a computer program product stored in a machine-readable medium, such as the memory 103 and/or the storage medium 105.

In a first operation 510, the processing unit 102 may generate at least one bytecode during execution of a program. In a second operation 520, the processing unit 102 may select default directives for the at least one bytecode, the default directives for directing compilation of the at least one bytecode into machine code by a just-in-time compiler, from a set of default directives. In a third operation 530, prior to compilation of the at least one bytecode into machine code, the processing unit 102 may embed the default directives into the at least one bytecode or a separate stream associated with the at least one bytecode. The at least one bytecode may be compiled into machine code by the just-in-time compiler directed by the embedded default directives in relatively few passes and in some instances, one pass.

Method 500 may include a fourth operation 540. In the fourth operation 540, the computing device 108 may compile the at least one bytecode into machine code in with the just-in-time compiler directed by the embedded default directives and/or interpret the at least one bytecode with an interpreter. The at least one bytecode may be compiled into machine code with the just-in-time compiler directed by the embedded default directives in relatively few passes and in some instances, one pass.

The present disclosure may provide systems and methods for providing a bytecode representation of a program that can be one-pass compiled into machine code utilizing a just-in-time compiler. The present disclosure may shift performance of compilation activities from compilation to translation into the bytecode representation. By shifting these activities, the just-in-time compiler may be enabled to compile the bytecode representation in one-pass as most compilation activities other than machine code generation may have already been performed. Thus, machine cycles and/or other resources necessary for just-in-time compilation may be reduced. The shifted activities may be performed in the context of compilation of bytecodes from source code, in the context of assembly of bytecodes as part of a static and/or dynamic code generation mechanism, such as a post-processing step on previously generated bytecodes without directives, or as a post-processing step refining or adapting previously created directives.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A computer-implemented method, comprising:
prior to compilation of a program into machine code, generating directives about the program, the directives for directing compilation of the program into machine code by a just-in-time compiler;
embedding the directives into a bytecode representation of the program, stored in a machine-readable medium, wherein at least a portion of the bytecode representation can be one-pass compiled into machine code by the just-in-time compiler directed by the embedded directives and
compiling the at least a portion of the bytecode representation into machine code in one-pass with the just-in-time compiler using the embedded directives.

2. The computer-implemented method of claim 1, wherein said compiling the at least a portion of the bytecode representation into machine code in one-pass with the just-in-time compiler directed the embedded directives comprises:
verifying the at least a portion of the bytecode representation.

3. The computer-implemented method of claim 1, wherein said prior to compilation of a program into machine code, generating directives about the program, the directives for directing compilation of the program into machine code by a just-in-time compiler, comprises:

computing at least one of refined types, loop structure, value invariance, value liveness, register allocation, type profiles, execution counts, type estimates, profile estimates, inlining directives, optimistic value assertions, optimistic type assertions, and customization points for the program.

4. The computer-implemented method of claim 1, wherein said prior to compilation of a program into machine code, generating directives about the program, the directives for directing compilation of the program into machine code by a just-in-time compiler, comprises:

optimizing the program by performing at least one of inlining, code customization, loop transformation, induction variable analysis, loop fission, loop fusion, loop inversion, loop interchange, loop-invariant code motion, loop nest optimization, loop reversal, loop unrolling, loop splitting, loop unswitching, software pipelining, constant folding and propagation, strength reduction, common subexpression elimination, induction variable reorganization and elimination, alias classification and pointer analysis, global value renumbering, global code motion, sparse conditional constant propagation, instruction selection, instruction scheduling, rematerialization, reordering computations, removing recursion, data structure fusion, bounds-checking elimination, branch offset reduction, code-block reordering, dead code elimination, factoring out of invariants, jump threading, reduction of cache collisions, stack height reduction, test reordering, trace-splitting, method removal, and method trace removal.

5. The computer-implemented method of claim 1, wherein said prior to compilation of a program into machine code, generating directives about the program, the directives for directing compilation of the program into machine code by a just-in-time compiler, comprises:

selecting the directives from a set of default directives.

6. The computer-implemented method of claim 1, wherein said prior to compilation of a program into machine code, generating directives about the program, the directives for directing compilation of the program into machine code by a just-in-time compiler, comprises:

generating the directives about the program for compilation of the program into machine code for a specific type of processing unit.

7. The computer-implemented method of claim 6, further comprising:

compiling the at least a portion of the bytecode representation into machine code for a second type of processing unit in one-pass with the just-in-time compiler utilizing the embedded directives.

8. The computer-implemented method of claim 1, wherein said prior to compilation of a program into machine code, generating directives about the program, the directives for directing compilation of the program into machine code by a just-in-time compiler, comprises:

processing a source code representation of the program to generate the directives.

9. The computer-implemented method of claim 1, wherein said prior to compilation of a program into machine code, generating directives about the program, the directives for directing compilation of the program into machine code by a just-in-time compiler, comprises:

processing a first type of bytecode representation of the program to generate the directives, wherein said embedding the directives into a bytecode representation of the program comprises:

embedding the directives into at least one of a second type of bytecode representation of the program and a separate stream associated with the second type of bytecode representation of the program.

10. The computer-implemented method of claim 1, further comprising:

interpreting the at least a portion of the bytecode representation of the program with an interpreter.

11. The computer-implemented method of claim 10, wherein the interpreter comprises a virtual machine.

12. The computer-implemented method of claim 1, wherein said embedding the directives into a bytecode representation of the program comprises:

inserting at least one directive bytecode that includes the directives into the bytecode representation of the program, wherein the at least one directive bytecode does not represent a data-processing instruction and at least one directive bytecode does not represent a control instruction.

13. The computer-implemented method of claim 1, further comprising:

compressing the at least a portion of the bytecode representation.

14. The computer-implemented method of claim 13, further comprising:

decompressing the compressed at least a portion of the bytecode representation.

15. The computer-implemented method of claim 1, further comprising:

generating at least one bytecode during execution of the program;

selecting default directives, for directing compilation of the at least one bytecode into machine code by the just-in-time compiler, from the set of default directives; and prior to compilation of the at least one bytecode into machine code, embedding the default directives into at least one of the at least one bytecode and a separate stream associated with the at least one bytecode, wherein the at least one bytecode can be one-pass compiled into machine code by the just-in-time compiler directed by the embedded default directives.

16. The computer-implemented method of claim 15, further comprising:

interpreting the at least one bytecode with an interpreter.

17. A system, comprising:

a processing unit for generating directives about a program prior to compilation of the program into machine code, the directives for directing compilation of the program into machine code by a just-in-time compiler; and a memory, communicably coupled to the processing unit, wherein the processing unit is operable to embed the directives into a bytecode representation of the program wherein at least a portion of the bytecode can be one-pass compiled into machine code by the just-in-time compiler utilizing the embedded directives.

18. A computer program product, including a computer readable storage medium and instructions executable by a processing unit tangibly embodied in the computer readable storage medium, the instructions comprising:

a first set of instructions for, prior to compilation of a program into machine code, generating directives about the program, the directives for directing compilation of the program into machine code by a just-in-time compiler; and a second set of instructions for embedding the directives into a bytecode representation of the program, wherein at least a portion of the bytecode representation can be one-pass compiled into machine code by the just-in-time compiler utilizing the embedded directives.

* * * * *